United States Patent
Cheng et al.

(10) Patent No.: US 10,050,877 B2
(45) Date of Patent: Aug. 14, 2018

(54) PACKET FORWARDING METHOD AND APPARATUS

(71) Applicant: Huawei Technologies Co., Ltd., Shenzhen (CN)

(72) Inventors: Pu Cheng, Nanjing (CN); Guangrui Wu, Nanjing (CN); Qinfeng Gu, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 99 days.

(21) Appl. No.: 15/164,362

(22) Filed: May 25, 2016

(65) Prior Publication Data
US 2016/0269284 A1 Sep. 15, 2016

Related U.S. Application Data

(63) Continuation of application No. PCT/CN2014/078247, filed on May 23, 2014.

(30) Foreign Application Priority Data

Nov. 25, 2013 (CN) .......................... 2013 1 0603848

(51) Int. Cl.
*H04L 12/721* (2013.01)
*H04L 12/66* (2006.01)
(Continued)

(52) U.S. Cl.
CPC .......... *H04L 45/66* (2013.01); *H04L 12/4633* (2013.01); *H04L 12/66* (2013.01);
(Continued)

(58) Field of Classification Search
CPC ....... H04L 12/46; H04L 12/66; H04L 12/707; H04L 12/721; H04L 12/741;
(Continued)

(56) References Cited

U.S. PATENT DOCUMENTS 8,619,595 B2 * 12/2013 Sajassi .................. H04L 12/462
370/242
8,798,055 B1 * 8/2014 An ........................ H04L 49/604
370/390
(Continued)

FOREIGN PATENT DOCUMENTS

CN 102075438 A 5/2011
CN 102638389 A 8/2012
(Continued)

OTHER PUBLICATIONS

Thaler et al., "Multipath Issues in Unicast and Multicast Next-Hop Selection," Network Working Group, Request for Comments: 2991, pp. 1-9, IETF Trust, Reston, Virginia (Nov. 2000).

*Primary Examiner* — Tri H Phan
(74) *Attorney, Agent, or Firm* — Leydig, Voit & Mayer, Ltd.

(57) ABSTRACT

The present application discloses a packet forwarding method and apparatus. An access device receives a first packet, where the first packet is an Ethernet packet, searches an equal-cost multi-path forwarding entry for a matched equal-cost path according to a destination MAC address of the Ethernet packet, where the equal-cost multi-path forwarding entry includes: a virtual MAC address corresponding to a gateway aggregation group, an identifier of each gateway device in the gateway aggregation group, and an outbound interface corresponding to the identifier of each gateway device, where the identifier is used to uniquely identify a gateway device in a large layer 2 network; and if N matched equal-cost paths are found, encapsulates the first packet into a second packet according to a first path in the N matched equal-cost paths, and forwards the second packet according to an outbound interface of the first path.

13 Claims, 2 Drawing Sheets

(51) Int. Cl.
*H04L 12/707* (2013.01)
*H04L 12/741* (2013.01)
*H04L 12/46* (2006.01)

(52) U.S. Cl.
CPC .............. *H04L 45/12* (2013.01); *H04L 45/24* (2013.01); *H04L 45/74* (2013.01)

(58) Field of Classification Search
CPC ..... H04L 12/4633; H04L 29/12; H04L 45/12; H04L 45/24; H04L 45/66; H04L 45/74
See application file for complete search history.

(56) References Cited

U.S. PATENT DOCUMENTS

| | | | | |
|---|---|---|---|---|
| 9,154,416 | B2* | 10/2015 | Koganti | ................. H04L 49/356 |
| 2011/0007629 | A1* | 1/2011 | Atlas | ........................ H04L 45/00 370/225 |
| 2011/0194403 | A1* | 8/2011 | Sajassi | .................. H04L 12/462 370/217 |
| 2012/0243539 | A1* | 9/2012 | Keesara | .................. H04L 45/66 370/392 |
| 2013/0003738 | A1 | 1/2013 | Koganti et al. | |
| 2013/0250951 | A1 | 9/2013 | Koganti | |
| 2013/0336164 | A1* | 12/2013 | Yang | ..................... H04L 47/125 370/255 |
| 2013/0343395 | A1* | 12/2013 | Kamble | .............. H04L 12/4625 370/401 |
| 2014/0056178 | A1* | 2/2014 | Tsai | ........................ H04L 49/65 370/256 |
| 2014/0071987 | A1* | 3/2014 | Janardhanan | ........... H04L 45/66 370/390 |
| 2014/0269701 | A1* | 9/2014 | Kaushik | ................ H04L 45/586 370/390 |
| 2014/0310391 | A1* | 10/2014 | Sorenson, III | .......... H04L 45/24 709/223 |
| 2015/0016462 | A1* | 1/2015 | Zhou | ................... H04L 12/4633 370/392 |
| 2015/0023352 | A1* | 1/2015 | Yang | ..................... H04L 12/462 370/392 |

FOREIGN PATENT DOCUMENTS

| | | |
|---|---|---|
| CN | 103248569 A | 8/2013 |
| EP | 2677704 A1 | 12/2013 |
| WO | WO 2013117166 A1 | 8/2013 |

* cited by examiner

PACKET FORWARDING METHOD AND APPARATUS

CROSS-REFERENCE TO RELATED APPLICATIONS

This application is a continuation of International Patent Application No. PCT/CN2014/078247, filed on May 23, 2014, which claims priority to Chinese Patent Application No. 201310603848.9, filed on Nov. 25, 2013, both of which are hereby incorporated by reference in their entireties.

TECHNICAL FIELD

The present invention relates to the field of network technologies, and in particular, to a packet forwarding method and apparatus.

BACKGROUND

Transparent Interconnection of Lots of Links (TRILL), as a layer 2 forwarding technology, is used to implement interconnection between data centers.

FIG. 1 is a typical networking diagram of the TRILL. A node in TRILL networking is referred to as a routing bridge (RB). In typical TRILL networking, an RB located at a core layer can be configured as a layer 3 gateway. For example, four nodes at an upper layer shown in FIG. 1 are configured to implement packet forwarding in a current data center and packet forwarding between the current data center and another data center; and an RB located at an access layer (hereinafter referred to as an access device) is configured to connect to a user side device, for example, five nodes at a lower layer shown in FIG. 1. The access device sends, to a gateway according to a learned relationship between a nickname of the RB and a media access control (MAC) address, a packet destined to a user side device connected to another access device in the current data center or a packet destined to a user side device in another data center, and then the gateway forwards the packet to the destination device.

To implement load sharing among multiple gateways, the multiple gateways may be aggregated into one gateway aggregation group (also referred to as a multi-active gateway), and a virtual nickname and a virtual MAC address are allocated to the gateway aggregation group. Each gateway device in a gateway aggregation group has a same virtual nickname and virtual MAC address.

The gateway aggregation group performs packet forwarding based on a load sharing mechanism, so that packets from a same source may be forwarded through different gateway devices in the gateway aggregation group. When performing layer 3 forwarding, a gateway device in the gateway aggregation group performs packet encapsulation by using the nickname and the MAC address of the gateway aggregation group. In this way, when a MAC address is learned on an access device, a learned MAC address and nickname are the virtual MAC address and the virtual nickname of the gateway aggregation group. In a backhaul direction, after receiving a packet sent by a gateway, the access device first performs a Reverse Path Forwarding (RPF) check, that is, queries a MAC address table by using a source MAC address and a source nickname of the packet, and determines whether a found outbound port is consistent with a receiving port of the packet. If the found outbound port is consistent with the receiving port of the packet, the access device queries, according to a destination MAC address of the packet, a matched MAC address entry, and forwards the packet; and if the found outbound port is inconsistent with the receiving port of the packet, the packet is discarded. For the layer 3 forwarding, the outbound port that is in the MAC address entry and is previously learned by the access device may be inconsistent with the receiving port of the packet (for example, for packets sent to a same user of the access device, the gateway aggregation group distributes a packet in previous load sharing to a gateway 1 to forward the packet to the access device, and distributes a current packet in current load sharing to a gateway 2 to forward the current packet to the access device, that is, for packets with a same source MAC address and a same source nickname, a current receiving port is inconsistent with a previous receiving port). Therefore, the RPF check fails, so that the packet forwarding fails.

Therefore, a technical problem that exists in the prior art is that: for layer 3 forwarding, an access device learns a correspondence among a virtual MAC address and a virtual nickname of a gateway aggregation group and a port, and performs packet forwarding processing based on a MAC address table, and therefore, a technical problem of a failure of an RPF check may be caused.

SUMMARY

The present invention provides a packet forwarding method and apparatus, which are used to solve a technical problem in the prior art that: for layer 3 forwarding, an access device learns a correspondence among a virtual MAC address and a virtual nickname of a gateway aggregation group and a port, and performs packet forwarding processing based on a MAC address table, and therefore, a failure of an RPF check may be caused.

According to a first aspect, the present invention provides a packet forwarding method, where the method is applied to a large layer 2 network including an access device and gateway devices, and includes: receiving, by the access device, a first packet, where the first packet is an Ethernet packet; searching, by the access device, an equal-cost multi-path forwarding entry for a matched equal-cost path according to a destination MAC address of the Ethernet packet, where the equal-cost multi-path forwarding entry includes: a virtual MAC address corresponding to a gateway aggregation group, an identifier of each gateway device in the gateway aggregation group, and an outbound interface corresponding to the identifier of each gateway device, where the identifier is used to uniquely identify a gateway device in the large layer 2 network; and if N matched equal-cost paths are found, encapsulating the first packet into a second packet according to a first path in the N matched equal-cost paths, and forwarding the second packet according to an outbound interface of the first path, where the second packet is a large layer 2 protocol packet, and N is an integer greater than 1.

According to a second aspect, the present invention provides a packet forwarding apparatus, where the apparatus is applied to a large layer 2 network including an access device and gateway devices, and includes: a receiving unit, configured to receive a first packet, where the first packet is an Ethernet packet; a searching unit, configured to search an equal-cost multi-path forwarding entry for a matched equal-cost path equal-cost multi-path according to a destination MAC address of the Ethernet packet that is received by the receiving unit, where the equal-cost multi-path forwarding entry includes: a virtual MAC address corresponding to a gateway aggregation group, an identifier of each gateway device in the gateway aggregation group, and an outbound interface corresponding to the identifier of each gateway device, where the identifier is used to uniquely identify a gateway device in the large layer 2 network; and a first forwarding unit, configured to: if the searching unit finds N matched equal-cost paths, encapsulate the first packet into a second packet according to a first path in the N matched equal-cost paths, and forward the second packet according to an outbound interface of the first path, where the second packet is a large layer 2 protocol packet, and N is an integer greater than 1.

With reference to the second aspect, in a first possible implementation manner, the first forwarding unit is specifically configured to obtain the second packet by performing large layer 2 network protocol encapsulation on the first packet, where a destination device identifier in a large layer 2 network protocol header of the second packet is an identifier of a gateway device corresponding to the first path.

One or more technical solutions of the foregoing technical solutions have the following technical effects or advantages:

In the present invention, an access device stores an equal-cost multi-path forwarding entry, where the equal-cost multi-path forwarding entry includes a virtual MAC address corresponding to a gateway aggregation group, an identifier of each gateway device in the gateway aggregation group, and an outbound interface corresponding to the identifier of each gateway device. When receiving an Ethernet packet and forwarding the Ethernet packet, the access device performs table lookup and forwarding processing preferentially according to the equal-cost multi-path forwarding entry. In this way, for a case in which a gateway needs to perform layer 3 forwarding processing on a packet, because the access device performs packet forwarding according to the equal-cost multi-path forwarding entry, a selected path corresponds to a specific gateway device, which ensures that a backhaul path is consistent with an original path, so that when a reverse path check is performed, the check can succeed, thereby ensuring forwarding of the packet.

DESCRIPTION OF EMBODIMENTS

Figure 1:
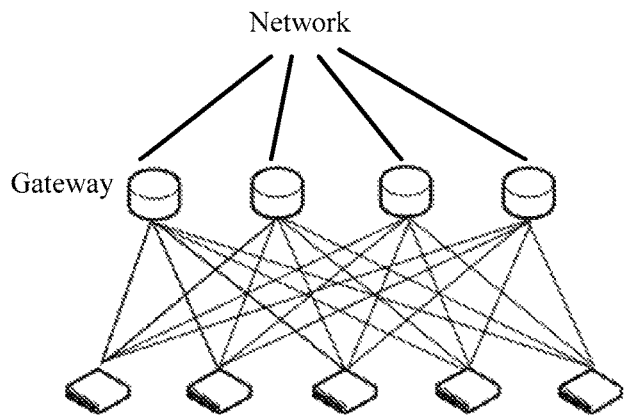
FIG. 1 is a schematic diagram of typical TRILL networking in the prior art.

To solve a technical problem in the prior art that: for layer 3 forwarding, an access device learns a correspondence among a virtual MAC address and a virtual nickname of a gateway aggregation group and an inbound port, and performs packet forwarding processing based on a MAC address table, and therefore, a failure of an RPF check may be caused, embodiments of the present invention provide a packet forwarding method and apparatus. The following describes in detail the technical solutions of the present invention with reference to the accompany drawings and specific embodiments. It should be understood that the embodiments of the present invention and specific characteristics in the embodiments are detailed descriptions for the technical solutions of the present invention, but are not limitations on the technical solutions of the present invention. In a case of no conflict, the embodiments of the present invention and technical characteristics in the embodiments can be mutually combined.

The packet forwarding method provided in the embodiments of the present invention can be applied to a large layer 2 network including an access device and gateway devices. A large layer 2 forwarding protocol used in the large layer 2 network may include but is not limited to the TRILL protocol, the Shortest Path Bridging (SPB) protocol, and the like.

In the embodiments of the present invention, multiple gateway devices in the large layer 2 network are aggregated into one gateway aggregation group, and a virtual MAC address is allocated to the gateway aggregation group. Each gateway device in the gateway aggregation group has a unique identifier. The identifier is a unique identifier of the gateway device in the large layer 2 network. For example, for a TRILL network, the identifier is a nickname. The gateway device sends, by means of information announcement, the virtual MAC address of the gateway aggregation group in which the gateway device is located and the identifier of the gateway device to the access device in the large layer 2 network, so that the access device in the large layer 2 network obtains an equal-cost multi-path forwarding entry.

Preferably, the gateway device may make the foregoing information announcement by using the Intermediate System to Intermediate System (IS-IS) protocol, where information of the announcement includes at least the virtual MAC address of the gateway aggregation group in which the gateway device is located and the identifier of the gateway device in the large layer 2 network. Certainly, another protocol may be used to make the foregoing information announcement.

In specific implementation, the gateway device may send a protocol packet in the large layer 2 network, where the protocol packet includes the virtual MAC address corresponding to the gateway aggregation group in which the gateway device is located and the identifier of the gateway device. The access device may obtain the equal-cost multi-path forwarding entry according to a protocol packet sent by each gateway device in the gateway aggregation group, where the equal-cost multi-path forwarding entry is used to instruct the access device to perform packet forwarding. The multi-path forwarding entry includes: the virtual MAC address corresponding to the gateway aggregation group, an identifier of each gateway device in the gateway aggregation group, and an outbound interface corresponding to the identifier of each gateway device, where the identifier is used to uniquely identify a gateway device in the large layer 2 network, and the outbound interface is a receiving port of the protocol packet.

Further, the gateway device may periodically send the foregoing protocol packet, or may send the foregoing protocol packet when a topology of the large layer 2 network changes. After the access device receives the foregoing protocol packet, if the access device has not generated an equal-cost multi-path forwarding entry at present, the equal-cost multi-path forwarding entry is generated and a keepalive timer corresponding to the equal-cost multi-path forwarding entry may be set; if the gateway device has already generated an equal-cost multi-path forwarding entry at present and according to the received protocol packet, content of the entry does not need to be updated, a keepalive timer of the entry may be refreshed; or if the access device has already generated an equal-cost multi-path forwarding entry at present and according to the received protocol packet, content of the entry has been updated, a keepalive timer of the entry may be further refreshed. When the keep-alive timer corresponding to the equal-cost multi-path forwarding entry times out, the access device may delete the equal-cost multi-path forwarding entry.

When receiving an Ethernet packet and forwarding the Ethernet packet, the access device may perform table lookup and forwarding preferentially according to the equal-cost multi-path forwarding entry.

Figure 2:
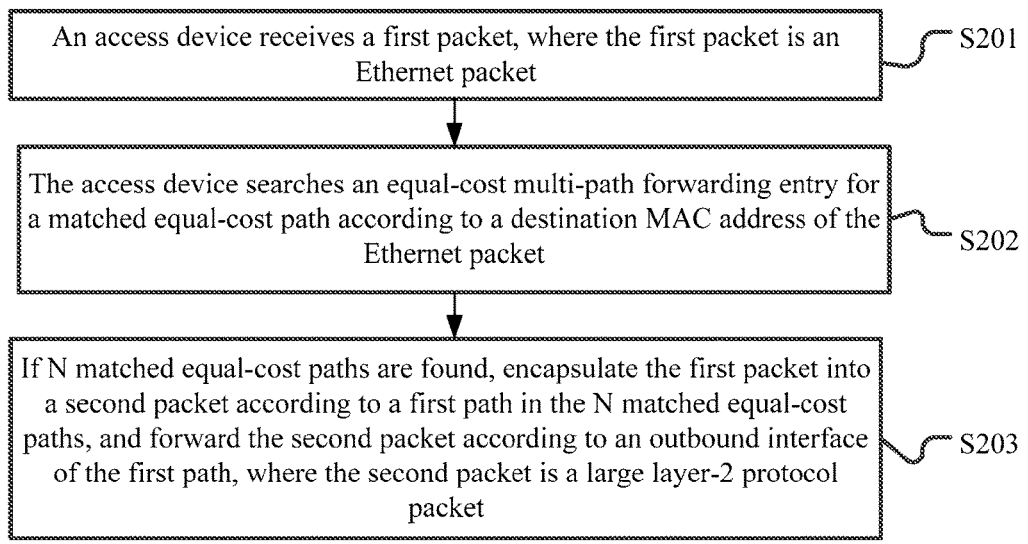
FIG. 2 is a schematic flowchart of a packet forwarding method according to an embodiment of the present invention.

Referring to FIG. 2, FIG. 2 is a schematic flowchart of a packet forwarding method according to an embodiment of the present invention. As shown in FIG. 2, a forwarding process after an access device receives an Ethernet packet may include:

S201. The access device receives a first packet, where the first packet is the Ethernet packet.

S202. The access device searches an equal-cost multi-path forwarding entry for a matched equal-cost path according to a destination MAC address of the Ethernet packet.

S203. If N matched equal-cost paths are found, encapsulate the first packet into a second packet according to a first path in the N matched equal-cost paths, and forward the second packet according to an outbound interface of the first path, where the second packet is a large layer 2 protocol packet, and N is an integer greater than 1.

According to the foregoing procedure, if the destination MAC address of the first packet is a virtual MAC address of a gateway aggregation group (in a case in which a destination user device and a source user device are not in a same network segment or a same virtual local area network (VLAN), the destination MAC address of the first packet sent by the source user device is the virtual MAC address of the gateway aggregation group, and the N matched equal-cost paths can be found according to the equal-cost multi-path forwarding entry; or if the destination MAC address of the first packet is not a virtual MAC address of a gateway aggregation group (in a case in which a destination user device and a source user device are in a same network segment or a same VLAN), no matched equal-cost path is found according to the equal-cost multi-path forwarding entry. In this case, a matched MAC address entry may be searched for according to the destination MAC address of the first packet, and after the matched MAC address entry is found, forwarding is performed according to the matched MAC address entry.

In the foregoing procedure, after finding the N matched equal-cost paths, the access device may select a path from the N matched equal-cost paths according to a load sharing algorithm to perform packet forwarding. Each access device uses the same load sharing algorithm, and the load sharing algorithm is the same as a load sharing algorithm used in the gateway aggregation group. This can ensure that a sending path and a backhaul path of a same data flow are consistent.

Further, the path selected from the N matched equal-cost paths is used as a path of a backhaul packet, and is recorded in a reverse path check entry together with the virtual MAC address of the gateway aggregation group. Therefore, this can further ensure that a sending path and a backhaul path of a same data flow are consistent.

Still further, a reverse path check means that a valid inbound interface of a multicast packet is obtained by means of multicast tree calculation. When a multicast packet is incoming from this port, the multicast packet is legal; when a multicast packet is incoming from another port, the multicast packet is invalid. Therefore, the foregoing procedure may further include: receiving, by the access device, a third packet, where the third packet is a packet with large layer 2 network protocol encapsulation, and a destination device identifier of a large layer 2 network protocol encapsulation header of the third packet is a unique device identifier of the access device in the large layer 2 network; and performing, by the access device, an RPF check on the third packet according to a reverse path check entry, decapsulating, after the check succeeds, the third packet to obtain an Ethernet packet, and forwarding, according to the MAC address entry, the Ethernet packet that is obtained by means of decapsulation.

Further, if the RPF check that is performed on the third packet according to the reverse path check entry fails, the access device performs a reverse path check on the third packet according to the MAC address entry, decapsulates, after the check succeeds, the third packet to obtain an Ethernet packet, and forwards, according to the MAC address entry, the Ethernet packet that is obtained by means of decapsulation.

In specific implementation, after receiving the packet of large layer 2 network protocol encapsulation of the access device, the access device may preferentially perform the RPF check according to the reverse path check entry. If the check performed according to the reverse path check entry succeeds, decapsulation is performed to obtain an Ethernet packet and forwarding processing is performed on the packet by querying the MAC address entry; if the RPF check performed according to the reverse path check entry fails, an RPF check may be performed according to a MAC address table; if the RPF check performed according to the MAC address table succeeds, decapsulation is performed to obtain an Ethernet packet and forwarding processing is performed on the Ethernet packet according to the MAC address entry; if the RPF check performed according to the MAC address table fails, forwarding of the packet is given up.

For example, when receiving a response packet of the first packet and performing an RPF check, the access device first queries the reverse path check entry. A source MAC address encapsulated at an outer layer of the response packet is the virtual MAC address of the gateway aggregation group, and a source device identifier is an identifier of a gateway device that is selected from the gateway aggregation group according to a load sharing algorithm. Because a sending path of the first packet is consistent with a backhaul path of a corresponding response packet, when an RPF check is performed on the response packet by using the reverse path check entry, a found port is the same as a receiving port of the response packet. Therefore, the RPF check succeeds, and the response packet can be properly forwarded.

In conclusion, because the access device performs packet forwarding according to the equal-cost multi-path forwarding entry and similarly, a backhaul packet is also forwarded according to the equal-cost multi-path forwarding path, a backhaul path is consistent with an original path. Therefore, when a reverse path check is performed, the check can succeed, thereby ensuring successful forwarding of the packet.

To describe the foregoing procedure more clearly, an application scenario in a TRILL network is used as an example for specific description.

In the application scenario of the TRILL network, there are four RBs at a core layer, where the four RBs are configured as gateways of VLAN1 and VLAN2, are represented as GW1, GW2, GW3, and GW4, and are aggregated into one gateway aggregation group. A virtual MAC address of the gateway aggregation group is represented as X-MAC, MAC addresses of the four gateways are represented as GW1_MAC, GW2_MAC, GW3_MAC, and GW4_MAC, nicknames of the four gateways are represented as GW1_nickname, GW2_nickname, GW3_nickname, and GW4_nickname, and a nickname of each gateway uniquely identifies a corresponding gateway in the TRILL network.

There are n RBs at an access layer in the TRILL network, which are represented as leaf1, leaf2, . . . , and leafn. A nickname of the leaf1 is represented as leaf1 nickname, and a MAC address of the leaf1 is represented as leaf1_MAC, and so on. The leaf1 is connected to a host (host, that is, a user equipment) 1, and the leaf2 is connected to a host2. An IP address of the host1 is represented as host1 IP and a MAC address of the host1 is represented as host1_MAC; an IP address of the host2 is represented as host2_IP and MAC address of the host2 is represented as host2_MAC; and the host1 belongs to the VLAN1 and the host2 belongs to the VLAN2.

A load sharing algorithm is configured on the leaf1, the leaf2, . . . , and the leafn, where the load sharing algorithm is consistent with a load sharing algorithm used in the gateway aggregation group. For example, a HASH operation may be performed according to quintuple information of a packet (for example, a source IP address, a destination IP address, a source port number, a destination port number, and a protocol number), and a corresponding forwarding path is selected according to an operation result.

The IS-IS protocol runs on the GW1, the GW2, the GW3, and the GW4, and information announcement is made by diffusing LSA (link-state advertisement) of the IS-IS to the TRILL network. In this embodiment, by expanding an IS-IS protocol packet, for example, defining a new IS-IS protocol packet or expanding an existing IS-IS protocol packet, the IS-IS protocol packet bears a virtual MAC address corresponding to a gateway aggregation group in which a gateway is located and a nickname of the gateway. The GW1, the GW2, the GW3, and the GW4 send, by using an expanded protocol packet, the virtual MAC address corresponding to the gateway aggregation group and the nickname of each gateway to an access device. Further, the expanded protocol packet may further carry other information, for example, information indicating that a device sending the expanded protocol packet is a gateway device, and information indicating that a gateway aggregation group in which the gateway device sending the expanded protocol packet is located is configured as gateways of specific VLANs.

After the leaf1 receives protocol packets sent by the GW1, the GW2, the GW3, and the GW4, an equal-cost multi-path forwarding entry shown in Table 1 may be generated.

TABLE 1

| MAC address | Nickname | Outbound interface |
|---|---|---|
| X-MAC | GW1_nickname | P1 |
| X-MAC | GW2_nickname | P2 |
| X-MAC | GW3_nickname | P3 |
| X-MAC | GW4_nickname | P4 |

P1 represents a receiving interface through which the leaf1 receives the protocol packet of the GW1, P2 represents a receiving interface through which the leaf1 receives the protocol packet of the GW2, P3 represents a receiving interface through which the leaf1 receives the protocol packet of the GW3, and P4 represents a receiving interface through which the leaf1 receives the protocol packet of the GW4. P1, P2, P3, and P4 are physical ports.

Further, the leaf1 may set a priority for the equal-cost multi-path forwarding entry, where the priority of the equal-cost multi-path forwarding entry is higher than a priority of a MAC address entry that is learned by the leaf1.

Similarly, on another leaf node, an equal-cost multi-path forwarding entry similar to Table 1 may also be generated.

When the host1 needs to send a packet to the host2, an ARP (Address Resolution Protocol) entry is queried or an ARP procedure is initiated according to the IP address of the host2, so as to obtain a corresponding MAC address. Because the host2 and the host1 belong to different VLANs, that is, the host1 and the host2 are not in a same network segment, the obtained MAC address is a MAC address of a default gateway of the VLAN1 to which the host1 belongs, and is the virtual MAC address X-MAC of the gateway aggregation group herein.

The host1 generates an Ethernet packet, where a source IP address of the Ethernet packet is a host1_IP, a source MAC address is a host_MAC, a destination IP address is a host2_IP, and a destination MAC address is an X_MAC; and sends the Ethernet packet to the leaf1.

After receiving the Ethernet packet, the leaf1 queries the equal-cost multi-path forwarding entry according to the destination MAC address X_MAC of the packet, and four equal-cost paths are matched (that is, four outbound interfaces are found). The leaf1 selects, according to the load sharing algorithm, P1 corresponding to the GW1_nickname, and then performs TRILL encapsulation on the Ethernet packet. An Ingress nickname of a TRILL header is the leaf1_nickname, and an Egress nickname of the TRILL header is the GW1_nickname. In addition, MAC encapsulation at an outer layer is added to an exterior of the TRILL header. A source MAC address is the leaf1_MAC, a destination MAC address is a next-hop MAC address, and the next-hop MAC address is the GW1_MAC herein. Afterwards, an encapsulated packet is sent through the port P1.

After the TRILL packet reaches the GW1, if the GW1 finds that the Egress nickname is the nickname of the GW1, the GW1 decapsulates the TRILL packet to obtain the Ethernet packet. The GW1 queries a routing table according to the destination IP address of the Ethernet packet, so as to obtain a next-hop IP address, where the next-hop IP address is the IP address of the leaf2 herein. The MAC address and the nickname of the leaf2 are obtained according to the IP address of the leaf2, and then TRILL encapsulation is performed on the Ethernet packet. The Ingress nickname of the TRILL header is the GW1_nickname, and the Egress nickname of the TRILL header is a leaf2_nickname. In addition, MAC encapsulation at an outer layer is added to an exterior of the TRILL header. A source MAC address is the GW1_MAC, a destination MAC address is a next-hop MAC address, and the next-hop MAC address is a leaf2_MAC herein. Afterwards, an encapsulated packet is sent through a corresponding port.

After the TRILL packet reaches the leaf2, the leaf2 decapsulates the TRILL packet to obtain the Ethernet packet, and forwards the Ethernet packet to the host2 according to the MAC address entry.

If the host2 responds to the packet, a forwarding process of the response packet is similar to the foregoing procedure. In this process, after finding four equal-cost paths according to the equal-cost multi-path forwarding entry, the leaf2 selects, based on the load sharing algorithm, the outbound interface corresponding to the GW1_nickname and forwards, to the GW1, the response packet with a TRILL encapsulation after receiving the TRILL packet, the GW1 performs layer 3 forwarding processing, re-encapsulates the response packet and forwards an encapsulated response packet to the leaf1; and after receiving the TRILL packet, the leaf1 performs an RPF check, that is, queries a reverse path check entry by using a source MAC address in a MAC encapsulation header at an outer layer of the TRILL packet (herein referred to as the X_MAC) and the Ingress nickname in the TRILL header (herein referred to as the GW1_nickname 1). A found interface is P1, which is consistent with a receiving interface of the TRILL packet. Therefore, the RPF check succeeds, and the leaf1 performs forwarding processing on the packet, to forward the packet to the host1.

Specifically, content of the reverse path check entry is similar to that of the equal-cost multi-path forwarding entry.

In the foregoing packet forwarding procedure, a related node learns a MAC address entry in an existing manner.

The foregoing procedure is described by using cross-VLAN forwarding as an example. For a procedure of packet forwarding across data centers, a gateway also needs to be triggered to perform layer 3 forwarding processing, and the forwarding procedure is similar to the foregoing procedure.

In a case of packet forwarding between same VLANs or in a case of packet forwarding (that is, local forwarding) between different hosts connected to one access device, matching fails when the access device queries a reverse path check entry. In this case, table lookup and forwarding may be performed according to a MAC address entry. A process of performing table lookup and forwarding according to the MAC address entry is the same as an existing procedure, and details are not described herein.

In the foregoing description of the specific scenario, forwarding of a unicast packet is used as an example. Forwarding of a multicast packet may also be implemented in a similar manner, and details are not described herein.

Based on a same inventive concept, the following embodiment introduces a packet forwarding apparatus, which is applied to a large layer 2 network including an access device and gateway devices.

Optionally, in this embodiment of the present invention, the packet forwarding apparatus is equal-cost to an access device.

Figure 3:
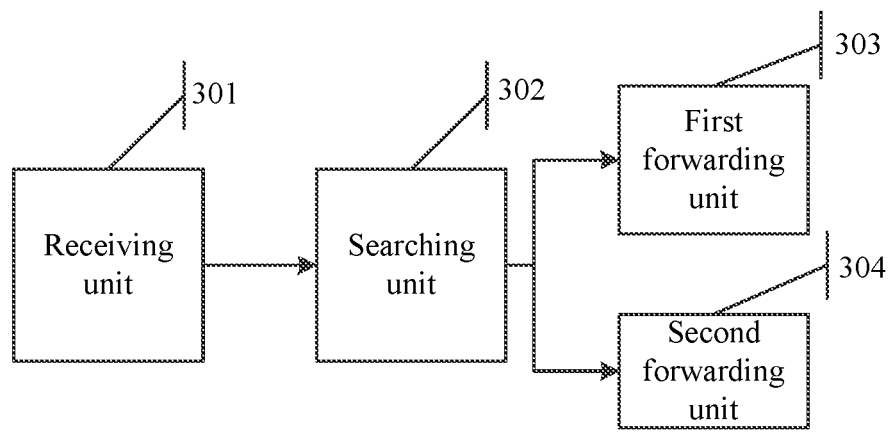
FIG. 3 is a schematic structural diagram of a packet forwarding apparatus according to an embodiment of the present invention.

Referring to FIG. 3, the packet forwarding apparatus in this embodiment of the present invention includes:

a receiving unit 301, configured to receive a first packet, where the first packet is an Ethernet packet;

a searching unit 302, configured to search an equal-cost multi-path forwarding entry for a matched equal-cost path according to a destination MAC address of the Ethernet packet that is received by the receiving unit 301, where the equal-cost multi-path forwarding entry includes: a virtual MAC address corresponding to a gateway aggregation group, an identifier of each gateway device in the gateway aggregation group, and an outbound interface corresponding to the identifier of each gateway device, where the identifier is used to uniquely identify a gateway device in the large layer 2 network; and a first forwarding unit 303, configured to: if the searching unit 302 finds N matched equal-cost paths, encapsulate the first packet into a second packet according to a first path in the N matched equal-cost paths, and forward the second packet according to an outbound interface of the first path, where the second packet is a large layer 2 protocol packet, N is an integer greater than 1, and the first path includes: a virtual MAC address corresponding to a gateway aggregation group in which a first gateway device is located, and an identifier and an outbound interface of the first gateway device, where the identifier is a unique device identify of the first gateway device in the large layer 2 network.

Further, the first forwarding unit 303 is specifically configured to obtain the second packet by performing large layer 2 network protocol encapsulation on the first packet, where a destination device identifier in a large layer 2 network protocol header of the second packet is an identifier of a gateway device corresponding to the first path.

Further, the apparatus further includes:

a second forwarding unit 304, configured to: if the searching unit 302 finds no matched equal-cost path in the equal-cost multi-path forwarding entry, search for a matched MAC address entry according to the destination MAC address of the first packet, and after the matched MAC address entry is found, forward the first packet according to the matched MAC address entry.

Further, the apparatus further includes:

a determining unit, configured to: before the first forwarding unit 303 encapsulates the first packet into the second packet according to the first path in the N matched equal-cost paths, determine, based on a load sharing algorithm, the first path from the N matched equal-cost paths.

Further, the load sharing algorithm is the same as a load sharing algorithm used in the gateway aggregation group.

Further, the apparatus further includes:

a maintaining unit, configured to: receive a protocol packet that is sent by each gateway device in the gateway aggregation group, where the protocol packet carries the virtual MAC address corresponding to the gateway aggregation group and carries an identifier of the gateway device sending the protocol packet; and obtain the equal-cost multi-path forwarding entry according to the protocol packet and a receiving interface of the protocol packet.

Further, the maintaining unit is further configured to set a priority of the equal-cost multi-path forwarding entry to a high priority, where the high priority is higher than a priority of a MAC address table.

Further, the apparatus further includes a checking unit, configured to: receive a third packet, where the third packet is a packet with large layer 2 network protocol encapsulation, and a destination device identifier of a large layer 2 network protocol encapsulation header of the third packet is a unique device identifier of the access device in the large layer 2 network; and perform a reverse path check on the third packet according to a reverse path check entry, decapsulate, after the check succeeds, the third packet to obtain an Ethernet packet, and forward, according to the MAC address entry, the Ethernet packet that is obtained by means of decapsulation.

Further, the checking unit is further configured to: if the reverse path check that is performed on the third packet according to the reverse path check entry fails, perform, a reverse path check on the third packet according to the MAC address entry, decapsulate, after the check succeeds, the third packet to obtain an Ethernet packet, and forward, according to the MAC address entry, the Ethernet packet that is obtained by means of decapsulation.

Figure 4:
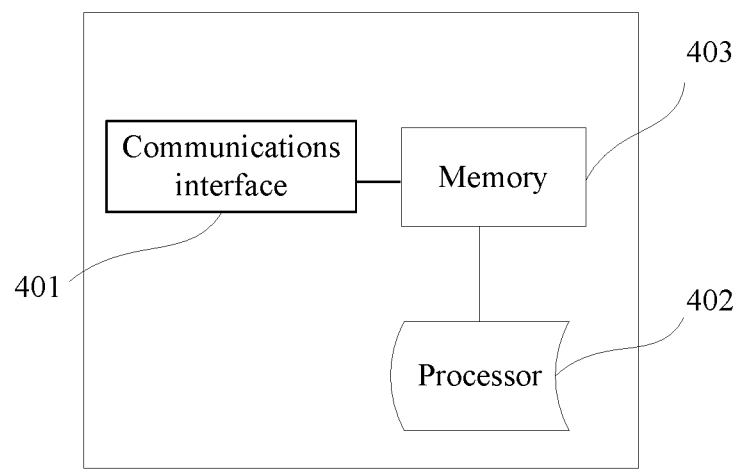
FIG. 4 is a schematic structural diagram of another packet forwarding apparatus according to an embodiment of the present invention.

Based on a same inventive concept, the following embodiment introduces a packet forwarding apparatus, which is applied to a large layer 2 network including an access device and gateway devices. Referring to FIG. 4, the packet forwarding apparatus includes: a communications interface 401, a memory 402, and a processor 403. Certainly, the packet forwarding apparatus may further include another universal part, which is not limited in this embodiment of the present invention.

The memory 402 stores a group of program code, and the processor 403 is configured to invoke the program code stored in the memory 402, where the program code is used to execute the following operations: receiving a first packet, where the first packet is an Ethernet packet; and searching an equal-cost multi-path forwarding entry for a matched equal-cost path according to a destination MAC address of the received Ethernet packet; and if N matched equal-cost paths are found, encapsulating the first packet into a second packet according to a first path in the N matched equal-cost paths, and forwarding the second packet according to an outbound interface of the first path, where the second packet is a large layer 2 protocol packet.

The multi-path forwarding entry includes: a virtual MAC address corresponding to a gateway aggregation group, an identifier of each gateway device in the gateway aggregation group, and an outbound interface corresponding to the identifier of each gateway device, where the identifier is used to uniquely identify a gateway device in the large layer 2 network, and N is an integer greater than 1.

The encapsulating the first packet into a second packet specifically includes:

obtaining the second packet by performing large layer 2 network protocol encapsulation on the first packet, where a destination device identifier in a large layer 2 network protocol header of the second packet is an identifier of a gateway device corresponding to the first path.

After the searching an equal-cost multi-path forwarding entry for a matched equal-cost path according to a destination MAC address of the Ethernet packet, the operations further include:

if no matched equal-cost path is found in the equal-cost multi-path forwarding entry, searching for a matched MAC address entry according to the destination MAC address of the first packet, and after the matched MAC address entry is found, forwarding the first packet according to the matched MAC address entry.

Before the encapsulating the first packet into a second packet according to a first path in the N matched equal-cost paths, the operations further include:

determining, based on a load sharing algorithm, the first path from the N matched equal-cost paths.

The processor is further configured to invoke the program code in the memory to obtain the equal-cost multi-path forwarding entry by performing the following operations:

receiving a protocol packet that is sent by each gateway device in the gateway aggregation group, where the protocol packet carries the virtual MAC address corresponding to the gateway aggregation group and carries an identifier of the gateway device sending the protocol packet; and obtaining the equal-cost multi-path forwarding entry according to the protocol packet and a receiving interface of the protocol packet.

After the obtaining the equal-cost multi-path forwarding entry, the operations further include:

setting a priority of the equal-cost multi-path forwarding entry to a high priority, where the high priority is higher than a priority of a MAC address table.

Further, the operations further include:

receiving a third packet, where the third packet is a packet with large layer 2 network protocol encapsulation, and a destination device identifier of a large layer 2 network protocol encapsulation header of the third packet is a unique device identifier of the packet forwarding apparatus in the large layer 2 network; and performing a reverse path check on the third packet according to a reverse path check entry, decapsulating, after the check succeeds, the third packet to obtain an Ethernet packet, and forwarding, according to the MAC address entry, the Ethernet packet that is obtained by means of decapsulation.

Further, the operations further include:

if the reverse path check that is performed on the third packet according to the reverse path check entry fails, performing a reverse path check on the third packet according to the MAC address entry, decapsulating, after the check succeeds, the third packet to obtain an Ethernet packet, and forwarding, according to the MAC address entry, the Ethernet packet that is obtained by means of decapsulation.

The following technical effects can be achieved by using one or more embodiments of the present invention.

In the present invention, an access device stores an equal-cost multi-path forwarding entry, where the equal-cost multi-path forwarding entry includes a virtual MAC address corresponding to a gateway aggregation group, an identifier of each gateway device in the gateway aggregation group, and an outbound interface corresponding to the identifier of each gateway device. When receiving an Ethernet packet and forwarding the Ethernet packet, the access device performs table lookup and forwarding processing preferentially according to the equal-cost multi-path forwarding entry. In this way, for a case in which a gateway needs to perform layer 3 forwarding processing on a packet, because the access device performs packet forwarding according to the equal-cost multi-path forwarding entry, a selected path corresponds to a specific gateway device, which ensures that a backhaul path is consistent with an original path, so that when a reverse path check is performed, the check can succeed, thereby ensuring forwarding of the packet.

A person skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a CD-ROM, an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more procedures in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more procedures in the flowcharts and/or in one or more blocks in the block diagrams.

These computer program instructions may also be loaded onto a computer or any other programmable data processing device, so that a series of operations and steps are performed on the computer or any other programmable device, to generate computer-implemented processing. Therefore, the instructions executed on the computer or any other programmable device provide steps for implementing a specific function in one or more procedures in the flowcharts and/or in one or more blocks in the block diagrams.

Obviously, a person skilled in the art can make various modifications and variations to the present invention without departing from the scope of the present invention. The present invention is intended to cover these modifications and variations provided that they fall within the protection scope defined by the claims of the present invention and their equivalent technologies.

What is claimed is:

1. A packet forwarding method for a large layer 2 network comprising an access device and gateway devices, the method comprising:
   receiving, by the access device, a first packet, wherein the first packet is an Ethernet packet;
   searching, by the access device, an equal-cost multi-path forwarding entry for a matched equal-cost path according to a destination media access control (MAC) address of the Ethernet packet, wherein the equal-cost multi-path forwarding entry comprises: a virtual MAC address corresponding to a gateway aggregation group comprising the gateway devices, an identifier of each gateway device in the gateway aggregation group, and an outbound interface corresponding to the identifier of each gateway device, wherein each identifier uniquely identifies a gateway device in the large layer 2 network; and
   in response to N matched equal-cost paths being found, encapsulating the first packet into a second packet according to a first path of the N matched equal-cost paths and forwarding the second packet according to an outbound interface of the first path, wherein the second packet is a large layer 2 network protocol packet and N is an integer greater than 1;
   wherein the method further comprises:
   recording, by the access device, the first path in a reverse path check entry together with the virtual MAC address corresponding to the gateway aggregation group;
   receiving, by the access device, a third packet, wherein the third packet is a packet with large layer 2 network protocol encapsulation, and wherein a destination device identifier of a large layer 2 network protocol encapsulation header of the third packet is a unique device identifier of the access device in the large layer 2 network;
   performing, by the access device, a reverse path check on the third packet according to the reverse path check entry; and
   decapsulating, by the access device, after the reverse path check succeeds, the third packet to obtain an Ethernet packet, and forwarding, according to a MAC address entry, the obtained Ethernet packet.

2. The method according to claim 1, wherein the encapsulating further comprises:
   obtaining the second packet by performing large layer 2 network protocol encapsulation on the first packet, wherein a destination device identifier in a large layer 2 network protocol header of the second packet is an identifier of a gateway device corresponding to the first path.

3. The method according to claim 1, wherein before the encapsulating, the method further comprises:
   determining, based on a load sharing algorithm, the first path from the N matched equal-cost paths.

4. The method according to claim 1, wherein the method further comprises:
   receiving, by the access device, a protocol packet from each gateway device in the gateway aggregation group, wherein the protocol packet carries the virtual MAC address corresponding to the gateway aggregation group and carries an identifier of the gateway device sending the protocol packet; and
   obtaining, by the access device, the equal-cost multi-path forwarding entry according to the protocol packet and a receiving interface of the protocol packet.

5. The method according to claim 4, wherein after obtaining the equal-cost multi-path forwarding entry, the method further comprises:
   setting, by the access device, a priority of the equal-cost multi-path forwarding entry to a high priority, wherein the high priority is higher than a priority of a MAC address table.

6. The method according to claim 1, wherein the method further comprises:
   if the reverse path check that is performed on the third packet according to the reverse path check entry fails, performing, by the access device, a reverse path check on the third packet according to the MAC address entry, decapsulating, after the reverse path check according to the MAC address entry succeeding, the third packet to obtain an Ethernet packet corresponding to the third packet, and forwarding, according to the MAC address entry, the Ethernet packet corresponding to the third packet.

7. An access device of a large layer 2 network comprising the access device and gateway devices, wherein the access device comprises:
   a non-transitory computer-readable medium having processor-executable instructions stored thereon; and
   a processor, configured, based on execution of the processor-executable instructions to facilitatate:
   receiving a first packet, wherein the first packet is an Ethernet packet;
   searching an equal-cost multi-path forwarding entry for a matched equal-cost path according to a destination media access control (MAC) address of the Ethernet packet, wherein the equal-cost multi-path forwarding entry comprises: a virtual MAC address corresponding to a gateway aggregation group comprising the gateway devices, an identifier of each gateway device in the gateway aggregation group, and an outbound interface corresponding to the identifier of each gateway device, wherein each identifier uniquely identifies a gateway device in the large layer 2 network; and
   if N matched equal-cost paths are found, encapsulating the first packet into a second packet according to a first path of the N matched equal-cost paths and forwarding the second packet according to an outbound interface of the first path, wherein the second packet is a large layer 2 network protocol packet and N is an integer greater than 1;

wherein the processor is further configured to facilitate:
- recording by the access device the first path in a reverse path check entry together with the virtual MAC address corresponding to the gateway aggregation group;
- receiving, by the access device, a third packet, wherein the third packet is a packet with large layer 2 network protocol encapsulation, a destination device identifier of a large layer 2 network protocol encapsulation header of the third packet is a unique device identifier of the access device in the large layer 2 network;
- performing, by the access device, a reverse path check on the third packet according to the reverse path check entry; and
- decapsulating by the access device after the check succeeds the third packet to obtain an Ethernet packet, and forwarding, according to a MAC address entry, the obtained Ethernet packet.

8. The access device according to claim 7, wherein the encapsulating comprises performing large layer 2 network protocol encapsulation on the first packet, wherein a destination device identifier in a large layer 2 network protocol header of the second packet is an identifier of a gateway device corresponding to the first path.

9. The access device according to claim 7, wherein the processor is further configured to facilitate:
- if no matched equal-cost path is found in the equal-cost multi-path forwarding entry, searching for a matched MAC address entry according to the destination MAC address of the first packet, and after the matched MAC address entry is found, forwarding the first packet according to the matched MAC address entry.

10. The access device according to claim 7, wherein the processor is further configured to facilitate:
- determining, based on a load sharing algorithm, the first path from the N matched equal-cost paths.

11. The access device according to claim 7, wherein the processor is further configured to facilitate:
- receiving a protocol packet from each gateway device in the gateway aggregation group, wherein the protocol packet carries the virtual MAC address corresponding to the gateway aggregation group and carries an identifier of the gateway device sending the protocol packet; and obtaining the equal-cost multi-path forwarding entry according to the protocol packet and a receiving interface of the protocol packet.

12. The access device according to claim 11, wherein the processor is further configured to facilitate:
- setting a priority of the equal-cost multi-path forwarding entry to a high priority, wherein the high priority is higher than a priority of a MAC address table.

13. The access device according to claim 7, wherein the processor is further configured to facilitate:
- if the reverse path check that is performed on the third packet according to the reverse path check entry fails, performing a reverse path check on the third packet according to the MAC address entry, decapsulating, after the reverse path check according to the MAC address entry succeeds, the third packet to obtain an Ethernet packet corresponding to the third packet, and forwarding, according to the MAC address entry, the Ethernet packet corresponding to the third packet.

* * * * *